UNITED STATES PATENT OFFICE.

WALTER T. SCHEELE, OF HACKENSACK, NEW JERSEY, ASSIGNOR TO THE GOVERNMENT OF THE UNITED STATES, REPRESENTED BY THE SECRETARY OF THE NAVY.

INCENDIARY MIXTURE.

1,382,804. Specification of Letters Patent. Patented June 28, 1921.

No Drawing. Application filed December 9, 1919. Serial No. 343,569.

*To all whom it may concern:*

Be it known that I, WALTER T. SCHEELE, a citizen of Germany and having made application for citizenship in the United States, and a resident of Hackensack, New Jersey, have invented new and useful Improvements in Incendiary Mixtures, of which the following is a specification.

This invention relates to an incendiary mixture for use in warfare and may be incorporated in bombs or the like as desired.

One of the objects of the invention is to provide a mixture or composition of matter which will produce high temperature for a considerable length of time, such that materials of more or less combustible nature may be effectively ignited, in such a manner and short time interval, that the fire so started is extinguished with difficulty and proceeds so rapidly that it effects the complete destruction of a building or other object to which it may be applied.

A further object of the invention is, to produce a material which on ignition, will produce an exceedingly voluminous and high temperatured gas flame, which is extensive as well as intensive in its action on surrounding combustibles, and in addition, burns without the formation of black smoke, indicating complete combustion, and with an extremely brilliant yellow flame; altogether a mixture or composition of matter well adapted for use as material in warfare when filled in bombs and incendiary shells.

I have discovered that I can prepare an incendiary mixture having the above mentioned properties, by mixing hexamethylenetetramin which may be in powder, crystallized or granular form, and sodium peroxid. In carrying out this invention I may use hexamethylenetetramin and sodium peroxid as illustrated in the following example:

Hexamethylenetetramin 33⅓ parts
Sodium peroxid_____ 66⅔ parts

The hexamethylenetetramin and the sodium peroxid may be finely ground separately to a powder state, and then thoroughly mixed, at which time I assume a reaction to take place in the solid state which is indicated by the lack of the usual tendency of the sodium peroxid to absorb moisture from the surrounding air, and I further assume the formation of a compound having the formula:—

$$C_6H_{12}N_4Na_2O_2$$

which is analogous to the known explosive compound having the formula $$C_6H_{12}N_4H_2O_2$$

A further evidence of the formation of the compound, the reactional product of hexamethylenetetramin and sodium peroxid, is, that the proportions which I have chosen for the hexamethylenetetramin and sodium peroxid, lie very closely to the theoretical proportions demanded by the composition or formula $$C_6H_{12}N_4Na_2O_2$$

The reaction of the hexamethylenetetramin and sodium peroxid to form a third substance having the empirical formula mentioned above is vital to my invention, as the formation of the third substance tends to prevent any excess of sodium peroxid, over the amount necessary for the formation of the compound, from deliquescing in the air thus insuring the stability of the compound.

I do not limit myself to the exact proportions of ingredients of the hexamethylenetetramin and sodium peroxid as stated above, for I have found that salts normal or double, organic or inorganic, or additional compounds of hexamethylenetetramin may be substituted for hexamethylenetetramin, to carry out the invention, but in these cases the sodium peroxid is not well protected and the mixture is rendered more liable to deterioration by absorbing moisture from the air. And very different results are obtained by varying the proportions materially.

In use, the compound may be filled into lead tubes, or other suitable metallic containers, and may be ignited by any well-known fuse, detonator, or sulfuric acid in vials. In this form the container may be dropped from an aeroplane upon the desired objective, whereby the various objects of the invention are attained. Upon ignition of the incendiary mixture a voluminous and high temperatured gas flame is evolved which spreads rapidly, burning with great intensity, without the formation of black smoke or the evolution of sparks. The burning of the incendiary mixture may be detected by its brilliant yellow flame which revolves upon rising into the air. Tests of the incendiary mixtures made by the United States Government, and conducted to cover a wide scope to determine the various characteristics thereof, show in addition to the above mentioned properties that the incendiary mixture will also burn in water, thus having the possibilities of a flare for use in marine signaling.

Having now fully described my invention, what I claim is:—

1. A warfare composition containing hexamethylenetetramin and sodium peroxid.

2. The process of making sodium peroxid hexamethylenetetramin which comprises mixing sodium peroxid with hexamethylenetetramin.

3. A warfare composition containing hexamethylenetetramin and sodium peroxid in proportion 33⅓ hexamethylenetetramin and 66⅔ sodium peroxid.

4. A warfare composition containing hexamethylenetetramin and sodium peroxid and a new substance $$C_6H_{12}N_4Na_2O_2$$

5. A warfare composition containing hexamethylenetetramin and sodium peroxid both in fine powder form.

6. A warfare composition containing hexamethylenetetramin in crystallized form and sodium peroxid in powder form.

7. A warfare composition containing hexamethylenetetramin and sodium peroxid which upon ignition develops an enormous amount of heat, burns with a long voluminous flame which revolves on raising in the air without the production of black smoke.

Signed at Washington, District of Columbia, this 15th day of November, 1919.

WALTER T. SCHEELE.